(12) United States Patent
Yeo et al.

(10) Patent No.: US 11,825,295 B2
(45) Date of Patent: *Nov. 21, 2023

(54) METHOD FOR SCHEDULING IN MOBILE COMMUNICATION AND APPARATUS THEREOF

(71) Applicant: Electronics and Telecommunications Research Institute, Daejeon (KR)

(72) Inventors: Geon-Min Yeo, Daejeon (KR); Byung-Han Ryu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/693,364

(22) Filed: Mar. 13, 2022

(65) Prior Publication Data

US 2022/0201743 A1 Jun. 23, 2022

Related U.S. Application Data

(63) Continuation of application No. 13/539,999, filed on Jul. 2, 2012, now Pat. No. 11,310,825, which is a
(Continued)

(30) Foreign Application Priority Data

Nov. 2, 2005 (KR) .................. 10-2005-0104178

(51) Int. Cl.
*H04W 72/04* (2023.01)
*H04W 72/23* (2023.01)
*H04W 72/21* (2023.01)

(52) U.S. Cl.
CPC ............ *H04W 72/23* (2023.01); *H04W 72/21* (2023.01)

(58) Field of Classification Search
CPC ...................................................... H04W 72/04
See application file for complete search history.

(56) References Cited

U.S. PATENT DOCUMENTS 7,142,855 B2 11/2006 Bahl et al.
7,400,642 B2 7/2008 Koo et al.
(Continued)

FOREIGN PATENT DOCUMENTS

EP 1443719 A1 8/2004
EP 1487144 A1 12/2004
(Continued)

OTHER PUBLICATIONS

Written Opinion for Application No. PCT/KR2006/004538, 3 pages, dated Feb. 14, 2007.
(Continued)

*Primary Examiner* — Zhiren Qin
(74) *Attorney, Agent, or Firm* — INSIGHT LAW GROUP, PLLC; Seung Lee

(57) ABSTRACT

The present application relates to a scheduling device and method of a mobile communication system. In the packet scheduling method, a base station performs packet scheduling for a terminal station in a mobile communication system, and a transport channel comprising an uplink shared channel (UL-SCH) and a physical channel comprising an uplink grant channel (UL-GCH) between the terminal and the base station are classified into a plurality of channels. In addition, in the packet scheduling method: a) the base station receives scheduling information from the terminal; b) the base station allocates an uplink resource for uplink traffic transmission for terminal based on the received scheduling information; and c) information for the allocated uplink resource is transmitted to the terminal through the UL-GCH of the physical channel.

18 Claims, 6 Drawing Sheets

Related U.S. Application Data continuation of application No. 12/092,437, filed as application No. PCT/KR2006/004538 on Nov. 2, 2006, now abandoned.

(56) References Cited

U.S. PATENT DOCUMENTS

| | | | |
|---|---|---|---|
| 7,512,153 B2 | 3/2009 | Kwon et al. | |
| 8,175,039 B2 | 5/2012 | Heo et al. | |
| 2002/0025812 A1 | 2/2002 | Ahlstrand et al. | |
| 2002/0031119 A1* | 3/2002 | Brouet | H04W 72/23 370/386 |
| 2002/0114280 A1 | 8/2002 | Yi | |
| 2003/0064728 A1* | 4/2003 | Speight | H04W 72/21 455/450 |
| 2003/0156594 A1* | 8/2003 | Trott | H04B 7/2659 370/442 |
| 2005/0009527 A1* | 1/2005 | Sharma | H04W 76/27 455/445 |
| 2005/0047416 A1 | 3/2005 | Heo et al. | |
| 2005/0105553 A1 | 5/2005 | Zhang | |
| 2005/0111410 A1* | 5/2005 | Bazar | H04W 4/24 370/331 |
| 2005/0128964 A1 | 6/2005 | Tiedemann et al. | |
| 2005/0265390 A1* | 12/2005 | Lee | H04W 28/06 370/469 |
| 2005/0282494 A1* | 12/2005 | Kossi | H04W 88/06 455/519 |
| 2005/0288026 A1* | 12/2005 | Byun | H04W 36/18 455/442 |
| 2006/0018277 A1* | 1/2006 | Petrovic | H04L 47/30 370/329 |
| 2006/0077947 A1 | 4/2006 | Kim | |
| 2006/0087457 A1* | 4/2006 | Rachwalski | H04N 21/26613 341/50 |
| 2006/0114813 A1* | 6/2006 | Seki | H04B 7/061 370/208 |
| 2006/0215604 A1* | 9/2006 | Mueckenheim | H04W 72/52 370/329 |
| 2007/0133458 A1* | 6/2007 | Chandra | H04L 1/0025 370/329 |
| 2007/0281695 A1 | 12/2007 | Lohr et al. | |
| 2008/0144570 A1 | 6/2008 | Hsu et al. | |

FOREIGN PATENT DOCUMENTS

| | | |
|---|---|---|
| EP | 1509011 A3 | 2/2005 |
| EP | 1511245 A3 | 3/2005 |
| KR | 1020040096790 A | 11/2004 |
| KR | 1020050021083 A | 3/2005 |
| KR | 1020050021965 A | 3/2005 |
| WO | 07/066900 A1 | 6/2007 |

OTHER PUBLICATIONS

Non-final office action dated Oct. 22, 2013 for U.S. Appl. No. 13/539,999.
Final office action dated Jul. 14, 2014 for U.S. Appl. No. 13/539,999.
Non-final office action dated Jan. 29, 2015 for U.S. Appl. No. 13/539,999.
Final office action dated Aug. 18, 2015 for U.S. Appl. No. 13/539,999.
Non-final office action dated Mar. 23, 2016 for U.S. Appl. No. 13/539,999.
Final office action dated Nov. 4, 2016 for U.S. Appl. No. 13/539,999.
Non-final office action dated Jun. 22, 2017 for U.S. Appl. No. 13/539,999.
Final office action dated May 16, 2018 for U.S. Appl. No. 13/539,999.
Non-final office action dated Jan. 10, 2019 for U.S. Appl. No. 13/539,999.
Final office action dated May 3, 2019 for U.S. Appl. No. 13/539,999.
Non-final office action dated Sep. 19, 2019 for U.S. Appl. No. 13/539,999.
Final office action dated Apr. 9, 2020 for U.S. Appl. No. 13/539,999.
Non-final office action dated Nov. 5, 2020 for U.S. Appl. No. 13/539,999.
Final office action dated May 18, 2021 for U.S. Appl. No. 13/539,999.
Notice of Allowance dated Dec. 15, 2021 for U.S. Appl. No. 13/539,999.
Final office action dated Sep. 16, 2011 for U.S. Appl. No. 12/092,437.
Non-final office action dated Mar. 21, 2011 for U.S. Appl. No. 12/092,437.

\* cited by examiner

METHOD FOR SCHEDULING IN MOBILE COMMUNICATION AND APPARATUS THEREOF

RELATED APPLICATIONS

This application is a continuation of U.S. application Ser. No. 13/539,999 filed on Jul. 2, 2012, which is a continuation application of U.S. patent application Ser. No. 12/092,437 filed on May 2, 2008 (now abandoned), which is a 371 national phase application of PCT Application No. PCT/KR2006/004538 filed on Nov. 2, 2006, which claims the priority, and the benefit of, Korean Patent Application No. 10-2005-0104178 filed on Nov. 2, 2005. The contents of the aforementioned applications are incorporated by reference in their entirety.

BACKGROUND

The present application relates to a scheduling method of a mobile communication system, and more particularly, to a packet scheduling device and method for allocating resources to uplink traffic and downlink traffic.

Recently, as systems for wireless Internet services have been actively developed and standardized, a packet transmission technique has become increasingly important, and various efforts for gaining a first mover advantage in a fourth generation packet-based mobile communication system have been made.

A resource request and link packet scheduling method for satisfying a quality of service (QoS) and maximizing efficiency of radio resources is a specialized radio link sharing method, and it increases system capacity.

In a resource request process, a terminal informs a base station that there are data to be uplink-transmitted, and requests resources from the base station. Scheduling methods for allocating the resources to the terminal by the base station according to the resource request process includes an uplink scheduling method and a downlink scheduling method.

In the downlink scheduling method, the base station allocates the resources to the terminal while determining the number of data packets stored in a transmission buffer of the base station. In the uplink scheduling method, the base station allocates the resources to the terminal based on buffer state information transmitted from the terminal. Accordingly, in the uplink scheduling method, the terminal is required to efficiently request the resources to maximize the use of radio resources and to satisfy the QoS. To efficiently perform the resource request, it is required to report a state of the transmission buffer at an appropriate report time and to report appropriate information so that the QoS may be guaranteed.

For example, when it is not reported that the number of waiting data packets in the transmission buffer of a terminal is increased, data are not transmitted according to the resources allocated according to the state of the transmission buffer even when the uplink resource is allocated and the data are transmitted. Accordingly, the data do not satisfy a delay requirement, and the data may be discarded at a receiving unit even when the data are successfully transmitted. Performance of the uplink scheduling may be improved as frequencies for reporting the transmission buffer state are increased, but a trade-off, in which excessive radio resources are used, may be generated.

The appropriate report time has relevance to a time between a time for determining the resource request by the terminal and a time for receiving the request by the base station. As the time for receiving the resource request from the terminal is delayed, the transmitted data are deteriorated. The delay in receiving the resource request has relevance to a frame configuration and a channel configuration.

In addition, according to the appropriate information, the terminal may efficiently perform the uplink scheduling for a differentiated multimedia service. For example, in a case of a file transfer protocol (FTP) service that is not susceptible to the time delay compared to other services, packets waiting in the transmission buffer are more important than information of a packet firstly arriving at the transmission buffer (here, referred to as head-of-line (HOL)). Accordingly, since unnecessary information is not appropriate for using radio resources, it is required to provide efficient scheduling information for the appropriate information.

The scheduling information includes buffer state information reported from the terminal to the base station for the uplink scheduling, and it is required to provide optimum information to the scheduling information for efficient scheduling.

However, in a conventional packet-based mobile communication system, since channels for requesting and receiving the scheduling information are not classified and the terminal transmits the scheduling information by a random access method through a random access channel, a collision problematically occurs between information transmitted from the terminals. That is, since the terminals transmit the scheduling information through the random access channel without receiving resources for reporting the information to the base station, frequent collisions may be caused by frequent random accesses of the terminals and a delay may be caused by the frequent collisions. In addition, the scheduling information may not be transmitted at a required time.

SUMMARY

The present application has been made in an effort to provide a method for efficiently classifying channels for transmitting and receiving data and signals and performing a scheduling operation based on information transmitted through the classified channels in a packet-based mobile communication system. In addition, the present application has been made in an effort to provide a scheduling device and method for satisfying a quality of service (QoS) by classified channels. Further, the present application has been made in an effort to provide a scheduling device and method for providing scheduling information through classified channels so that a plurality of terminals may efficiently perform a scheduling operation.

In an exemplary packet scheduling method according to an embodiment in the present application, a base station performs packet scheduling for a terminal station in a mobile communication system, and a transport channel including an uplink shared channel (UL-SCH) and a physical channel including an uplink grant channel (UL-GCH) between the terminal and the base station are classified into a plurality of channels. In the exemplary packet scheduling method: a) the base station receives scheduling information from the terminal; b) the base station allocates an uplink resource for uplink traffic transmission for terminal based on the received scheduling information; and c) information for the allocated uplink resource is transmitted to the terminal through the UL-GCH of the physical channel.

In an exemplary packet scheduling method according to another embodiment in the present application, a base station performs a packet scheduling operation for a terminal in a mobile communication system, and a transport channel and a physical channel between the terminal and the base station are respectively classified into a plurality of channels. In the exemplary packet scheduling method: a) the base station receives scheduling information from the terminal; b) the base station allocates an uplink resource for uplink traffic transmission for the terminal based on the received scheduling information; c) information for the allocated uplink resource is transmitted to the terminal through an uplink grant channel (UL-GCH) that is one of the physical channels; d) the base station receives decoding information from the terminal through an uplink hybrid automatic repeat request (UL-HARQ) channel; e) the base station receives packet data from the terminal through a downlink shared channel (DL-SCH) that is one of the transport channels, and decodes the packet data based on the decoding information; and f) the base station transmits an error check result for the packet data to the terminal through a downlink feedback channel (DL-FCH) that is one of the physical channels.

An exemplary packet scheduling device according to a third exemplary embodiment in the present application performs scheduling for a session between a base station and a terminal in a mobile communication system, and transport and physical channels between the terminal and the base station are respectively classified into a plurality of channels. The exemplary packet scheduling device includes an uplink scheduler and an uplink hybrid automatic repeat request unit. The uplink scheduler allocates an uplink resource for uplink traffic transmission for the terminal based on scheduling information from the terminal, and transmits allocated resource information to the terminal through an uplink grant channel (UL-GCH) that is one of the physical channels. The uplink hybrid automatic repeat request unit receives packet data from the terminal through a downlink shared channel (DL-SCH) that is one of the transport channels, and transmits a result of an error check for the received packet data to the terminal through a downlink feedback channel (DL-FCH) that is one of the physical channels.

DETAILED DESCRIPTION

In the following detailed description, only certain exemplary embodiments have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive.

In addition, unless explicitly described to the contrary, the word "comprise", and variations such as "comprises" or "comprising", will be understood to imply the inclusion of stated elements but not the exclusion of any other elements.

Figure 1:
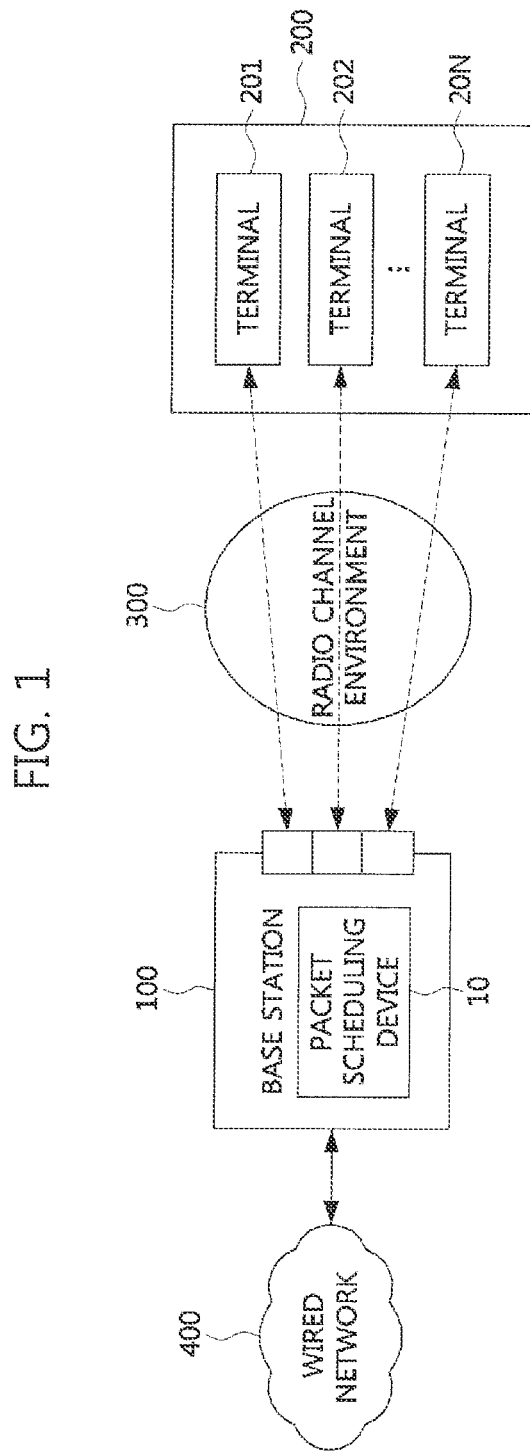
FIG. 1 shows a configuration diagram of a mobile communication system according to an exemplary embodiment in the present application.

FIG. 1 shows a configuration diagram of a mobile communication system according to an exemplary embodiment in the present application.

As shown in FIG. 1, in the mobile communication system according to the exemplary embodiment in the present application, a base station 100 transmits and receives data to/from a plurality of terminals 201, 202, . . . , and 20$n$ (here, $n$ is a positive integer) through a radio channel environment 300. Hereinafter, for better comprehension and ease of description, the plurality of terminals are denoted by one reference number "200".

The terminal 200 includes a transmission buffer (not shown) for storing uplink traffic data. The transmission buffer temporarily stores packet data to be transmitted to the base station 100, and the packet data are converted into a packet frame in a medium access control (MAC) layer to be transmitted to the base station 100 through a physical layer. Since the amount of packet traffic varies according to time, a state of the transmission buffer varies according to time. Accordingly, resources may be efficiently managed when information of the transmission buffer state is transmitted to the base station 100.

In this case, the information transmitted from the terminal 200 to the base station 100 will be referred to as scheduling information. The scheduling information includes buffer occupancy (BO) information indicating information of packet data waiting in the transmission buffer, head-of-line (HOL) delay time information, the number of packet data, and information for the scheduling operation that is provided by the terminal 200 to the base station 100.

The BO indicates a buffer state after transmitting data through resources allocated from the base station 100, and it indicates the number of packet data remaining in the transmission buffer. The number of packet data basically indicates a total of bites of packet data. In addition, when a predetermined number of bites form one basic transmission unit, the number of packet data may be the number of basic transmission units.

The HOL delay time indicates a time that lapses from a time for receiving a first packet data (i.e., the packet data firstly input to the transmission buffer among the waiting packet data) in the transmission buffer to a current time. In addition, the HOL delay time may indicate a time in which a transmission process is not performed after receiving the first packet data.

The terminal 200 converts the packet data waiting in the transmission buffer (i.e., a service data unit (SDU) input to the MAC layer from a higher layer) into the packet frame (i.e., a packet data unit (PDU)) and transmits the PDU. The PDU includes a header, a payload, and/or a cyclic redundancy check (CRC) for detecting an error. The header indicates a target address and a data type to receive the packet traffic. The payload stores data and has a length varying according to a type of packet data. In addition, the PDU without the payload of the packet traffic is referred to as a "state PDU". The state PDU is used to transmit predetermined information rather than transmitting data.

The terminal 200 may transmit the scheduling information to the base station 100 by various methods. A resource request method for requesting resource allocation by transmitting the scheduling information to the base station varies according to a method for transmitting the scheduling information, which is classified in Table 1.

TABLE 1

| Type | Definition |
| --- | --- |
| First resource request method | A terminal transmits scheduling information to the base station through the state PDU without transmitting data. |
| Second resource request method | A terminal transmits scheduling information to the base station by adding the scheduling information to a header of a data transmission PDU. |
| Third resource request method | A terminal transmits scheduling information to the base station by concatenating the scheduling information to a data transmission PDU. |
| Fourth resource request method | A terminal transmits scheduling information to the base station by a random access method. |
| Fifth resource request method | A terminal transmits scheduling information by using a physical channel. |

In the respective resource request methods, the scheduling information is processed as information elements (IE), and the IE may be added to the header of the PDU, concatenated to the PDU, or processed as the state PDU to transmit the scheduling information to the base station. Here, the IE indicates information including a plurality of bits.

The base station 100 transmits/receives data to/from the terminal 200, and performs a scheduling operation for an uplink channel (also referred to as an "uplink scheduling operation") of a terminal based on the scheduling information provided from the corresponding terminal. In addition, the base station 100 performs a scheduling operation for a downlink channel (also referred to as a "downlink scheduling operation") through which the data are provided to the terminal. Accordingly, the base station 100 includes a packet scheduling device 10, and transmits/receives the data to/from the at least one terminal to provide various pieces of information for the scheduling operation to the packet scheduling device 10.

In the exemplary embodiment in the present application, channels are classified as bellow so that the terminal may efficiently transmit the scheduling information and the base station may perform the scheduling operation based on the scheduling information.

The channels include a transport channel for transmitting data and a physically channel for transmitting a physical channel.

The transport channels are classified in Table 2.

TABLE 2

| DL-SCH | Downlink Shared Channel |
| --- | --- |
| UL-SCH | Uplink Shared Channel |
| RACH | Random Access Channel |

The DL-SCH and the UL-SCH are common channels used by all the terminals in the base station, the DL-SCH is used to perform downlink data transmission (i.e., from the base station to the terminal), and the UL-SCH is used to perform uplink data transmission (i.e., from the terminal to the base station). In addition, the RACH is used when the terminal that is not connected to the base station requests resources.

The physical channels are classified in Table 3.

TABLE 3

| DL-GCH | Downlink Grant Channel |
| --- | --- |
| UL-GCH | Uplink Grant Channel |
| UL-SICH | Uplink Scheduling Information Channel |

TABLE 3-continued

| UL-FCH | Uplink Feedback Channel |
| --- | --- |
| DL-FCH | Downlink Feedback Channel |
| UL-HCCH | Uplink HARQ Control Channel |

The DL-GCH is used to transmit downlink resource information allocated to the terminal receiving the data from the base station through the DL-SCH. The downlink resource information transmitted through the DL-GCH includes the following.
1) Terminal identifier (UE-Identify): a terminal identifier for identifying a terminal.
2) Hybrid automatic repeat request (HARQ) process information: an HARQ process identifier, more particularly, an HARQ process distinguisher used to apply N stop-and-wait HARQ operations.
3) Modulation scheme information: information required to restore data received from the base station, and more particularly, information for restoring the data transmitted from the base station through the DL-SCH.
4) Resource allocation information: allocation information for resource spaces in a time domain and a frequency domain when orthogonal frequency division multiplexing (OFDM) is applied.
5) Redundancy and constellation version: information of retransmission characteristics (which may be used when a turbo code is applied) when a retransmission operation according to the HARQ is performed.
6) New data indicator: a distinguisher for showing that the data transmitted though the DL-SCH are newly transmitted data.

The downlink resource allocation information transmitted through the DL-GCH according to the exemplary embodiment in the present application may include at least one among 1) to 6).

The UL-GCH is used to transmit uplink resource information allocated to the terminal. That is, the UL-GCH is used to transmit the uplink resource information allocated to the terminal for transmitting the data to the base station through the UL-SCH. The uplink resource information may include the following.
1) Terminal identifier (UE identity): a terminal identifier for identifying a terminal.
2) Modulation scheme information: information required to restore the data received from the terminal, and more particularly, information for restoring the data transmitted from the terminal through the UL-SCH.
3) Resource allocation information: allocation information for resource spaces in a time domain and a frequency domain when the OFDM is applied.

The uplink resource allocation information transmitted through the UL-GCH according to the exemplary embodiment in the present application may include at least one among 1) to 3).

The UL-HCCH is used to transmit the HARQ information for the data transmitted through the UL-SCH, and HARQ information includes the following.
1) HARQ process information: an HARQ process identifier, and more particularly, an HARQ process distinguisher used to apply N stop-and-wait HARQ operations.
2) Redundancy and constellation version: information of retransmission characteristics (which may be used when a turbo code is applied) when a retransmission operation according to the HARQ is performed.

3) New data indicator: an indicator for showing that the data transmitted though the UL-SCH are newly transmitted data.

The HARQ information transmitted from the terminal through the UL-HCCH according to the exemplary embodiment in the present application may include at least one among 1) to 3).

The UL-SICH is used to transmit the scheduling information (i.e., information of a buffer in which data to be transmitted from the base station to the terminal are awaiting).

The scheduling information transmitted through the UL-SICH includes the following.
1) Buffer occupancy (BO): information on bites of data awaiting in the buffer.
2) HOL delay time: a time that lapses from a time for inputting the first packet data (i.e., the packet data firstly input to the transmission buffer among the waiting packet data) to the transmission buffer to a current time.
3) Buffer empty indicator: an indicator for indicating that the buffer is empty. The scheduling information transmitted through the UL-SICH according to the exemplary embodiment in the present application may include at least one among 1) to 3). In addition, the scheduling information may further include the BO information for not-transmitted packets, the BO information for real-time transport control protocol (RTCP) packets, a request value for changing a resource allocation time, and a frame type indicator (FTI).

The DL-FCH is used to transmit first feedback information to the terminal, and the first feedback information includes an error check result for the data received in the base station through the UL-SCH. In addition, the first feedback information includes an acknowledgment (ACK) signal and a negative-acknowledgement (NACK) signal for the data received through the UL-SCH. Here, the ACK signal is a response signal indicating that the data are successfully received, and the NACK signal is a response signal indicating that an error for the data is generated.

The UL-FCH is used to transmit second feedback information to the base station, and the second feedback information includes an error check result for the data received through the DL-SCH. In addition, the second feedback information includes at least one among the ACK/NACK for the data received through the DL-SCH and a downlink channel quality indicator for indicating a quality of a downlink channel.

In the exemplary embodiment in the present application, since the classified transport and physical channels are used to transmit/receive data and signals including information for the scheduling operation, the resource request and scheduling operations may be efficiently performed.

A configuration of the packet scheduling device for performing the scheduling operation based on the above channels according to the exemplary embodiment in the present application will now be described.

Figure 2:
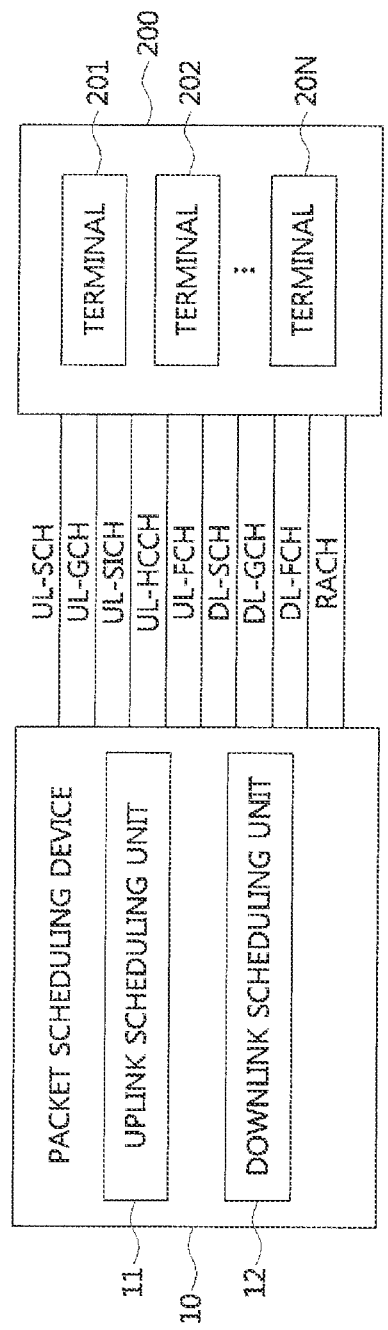
FIG. 2 shows a configuration diagram of a packet scheduling device according to the exemplary embodiment in the present application.
Figure 3:
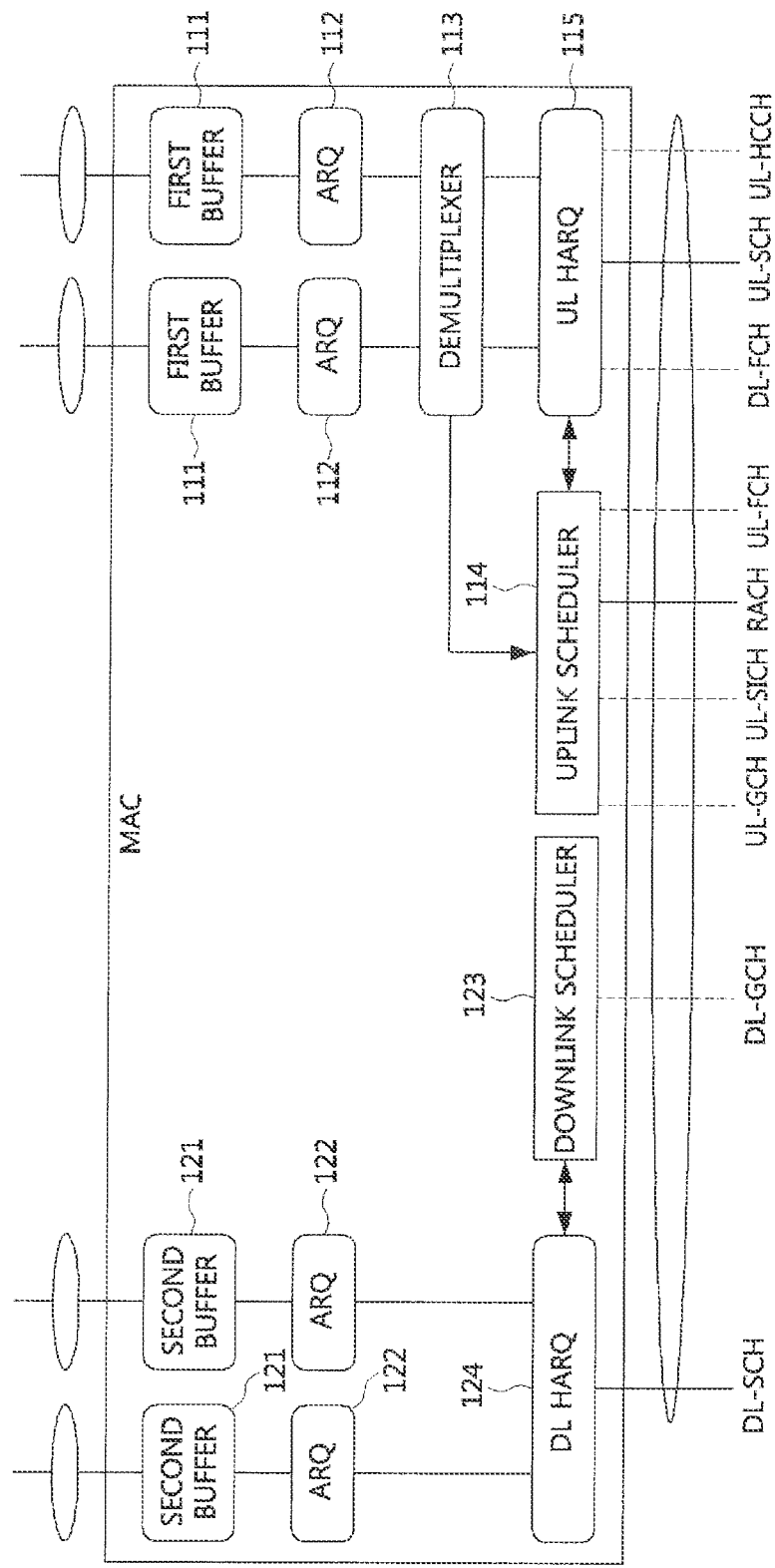
FIG. 3 shows a detailed configuration diagram representing the packet scheduling device shown in FIG. 2.

FIG. 2 shows a configuration diagram of the packet scheduling device according to the exemplary embodiment in the present application, and FIG. 3 shows a detailed configuration diagram representing the packet scheduling device shown in FIG. 2. Particularly, FIG. 3 shows a relationship between devices formed in the MAC layer and the classified channels.

As shown in FIG. 2 and FIG. 3, the packet scheduling device 10 according to the exemplary embodiment in the present application is formed in the MAC layer, and transmits/receives data and information to the terminal 200 through the classified channels (DL-SCH, DL-GCH, UL-GCH, UL-SICH, RACH, UL-FCH, DL-FCH, UL-SCH, and UL-HCCH). The packet scheduling device 10 includes an uplink scheduling unit 11 and a downlink scheduling unit 12.

The uplink scheduling unit 11 performs uplink scheduling based on the scheduling information provided from the terminal, and it includes a plurality of first buffers 111, an automatic repeat request (ARQ) unit 112, a demultiplexer 113, an uplink scheduler 114, and an uplink hybrid automatic repeat request (UL-HARD) unit 115.

The uplink scheduler 114 allocates uplink traffic resources for a terminal based on the scheduling information transmitted from the terminal. The uplink resource allocation information according to the resource allocation is transmitted to the terminal through the UL-GCH. Accordingly, the terminal transmits data to the base station 100 through the UL-SCH based on the uplink resource allocation information.

The UL-HARQ unit 115 receives uplink frame data from the terminal through the allocated resources, receives signals including information, and performs an error correction based on the data and signals. Particularly, the UL-HARQ unit 115 receives and processes the data transmitted through the UL-SCH and signals transmitted through the UL-HCCH, and transmits the first feedback information according to an error check result to the terminal through the DL-FCH.

The demultiplexer 113 receives and processes the uplink frame data and signals from the UL-HARQ 115. Particularly, the demultiplexer 113 extracts the scheduling information from the data transmitted through the UL-SCH, and transmits the scheduling information to the uplink scheduler 114. In addition, the demultiplexer 113 transmits the uplink frame data to the corresponding ARQ 112.

The ARQ 112 processes fragmented and concatenated packet data, and transmits them to the first buffer 111. Accordingly, the data are transmitted to a higher layer through the first buffer 111 and a logical channel.

The downlink scheduling unit 12 performs a downlink scheduling operation, and it includes a plurality of second buffers 121, an ARQ 122, a downlink scheduler 123, and a downlink hybrid automatic repeat request (DL-HARQ) unit 124.

The second buffer 121 is connected to the logical channel of the higher layer, and stores and manages data provided through the corresponding channel.

The ARQ 122 divides data provided from the second buffer 121 into predetermined packets, and concatenates the divided packets according to a transmission order. The divided packets are managed based on sequence numbers (SN), and the SN is updated according to a process state so that a receiving unit may assemble the corresponding packets.

The downlink scheduler 123 allocates downlink traffic resources to a terminal based on information on the second buffer. That is, the downlink scheduler 123 establishes terminals to which data are transmitted at a predetermined transmission time, establishes the second buffers related to the terminals, and allocates resources for transmitting the data to the terminals. The downlink resource allocation information according to the resource allocation is transmitted to the corresponding terminal through the DL-GCH, and the terminal receives the packet data from the base station 100 through the DL-SCH according to the downlink resource allocation information.

The DL-HARQ unit 124 multiplexes packets waiting in the second buffer based on the information provided from the downlink scheduler 123 (i.e., the information of the terminals receiving the data at the predetermined transmission time and the second buffers related to the terminals), and transmits the packets to the corresponding terminal through the DL-SCH.

In the packet scheduling device, the first and second buffers 111 and 121 may be respectively connected to the logical channels, and the respective logical channels may have different qualities of service (QoS). In addition, the ARQs 112 and 122 respectively include a plurality of ARQs respectively corresponding to the respective buffers. The plurality of first and second buffers may be allocated to one terminal.

The packet scheduling device according to the exemplary embodiment in the present application may be formed while separately including the downlink scheduling unit or the uplink scheduling unit. In the exemplary embodiment in the present application, the first and second buffers connected to the logical channel and the ARQ are included in the scheduling units 11 and 12, but they are not limited thereto, and the buffer and the ARQ may not be included in the scheduling units 11 and 12.

The packet scheduling device is directly connected to the physical layer to minimize a packet control delay, and controls the transport channel to improve efficiency of packet transmission.

An operation of the packet scheduling device according to the exemplary embodiment in the present application will now be described.

Firstly, a method for performing the downlink traffic scheduling operation will be described.

Figure 4:
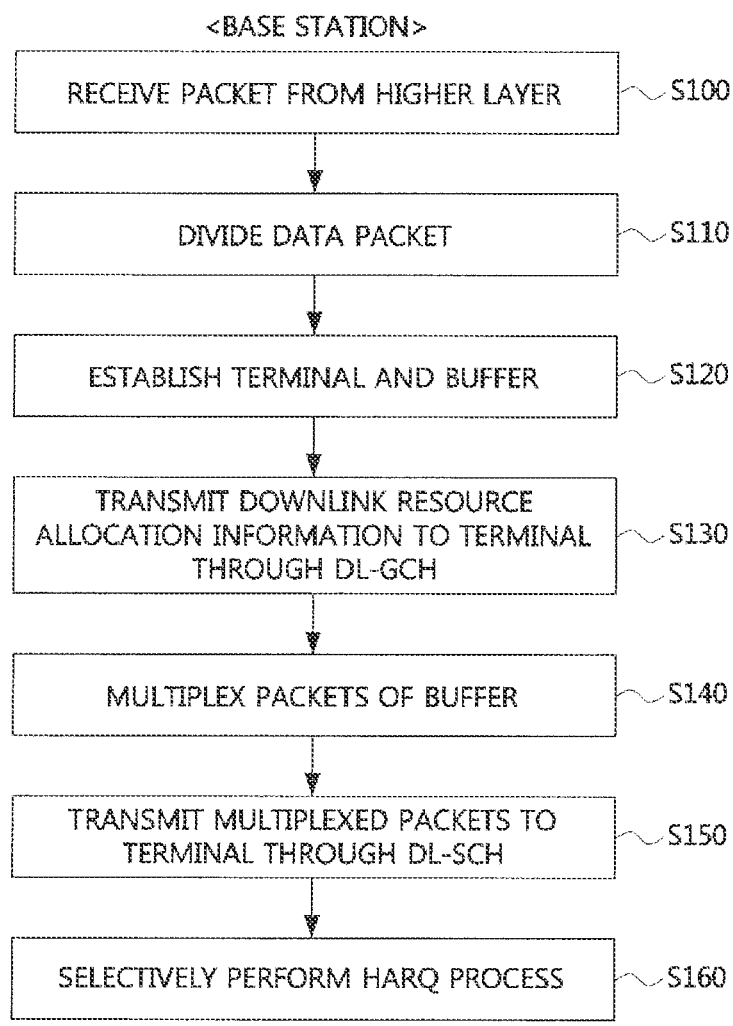
FIG. 4 shows a flowchart representing a downlink scheduling process of the packet scheduling device according to the exemplary embodiment in the present application.

FIG. 4 shows a flowchart representing a downlink scheduling process of the packet scheduling device according to the exemplary embodiment in the present application.

As shown in FIG. 4, when the data to be transmitted to the terminal are transmitted from the higher layer through the logical channel, the data are stored in the second buffer 121 corresponding to the downlink scheduling unit 12 in step S100. The ARQ 122 divides the data into packets and manages the packets based on the SN, and the second buffer 121 stores the packet in step S110.

The downlink scheduler 123 establishes a terminal to which the packet is transmitted, establishes the second buffer for storing the packet, and transmits establishment information to the DL-HARQ unit 124 in step S120. In addition, the number of packets stored in the second buffer is determined in real-time, resources for transmitting the packet to the terminal are allocated, and the downlink resource allocation information is transmitted through the DL-GCH. In this case, through the DL-GCH, the downlink resource allocation information including a terminal identifier, HARQ process information, modulation scheme information, resource allocation information, redundancy and constellation version, and a new data indicator may be transmitted in step S130.

In cooperation with the ARQ 122, the DL-HARQ unit 124 multiplexes the packet waiting in the second butter 121 based on the establishment information transmitted from the downlink scheduler 123 in step S140, and transmits the multiplexed packet to the terminal through the DL-SCH in step S150. That is, the ARQ 122 concatenates the packets stored in the second buffer 121 based on the SN, and the DL-HARQ unit 124 multiplexes the concatenated packets and transmits the packets to the terminal through the DL-SCH. Accordingly, the terminal 200 receives the packet transmitted through the DL-SCH, based on the downlink allocation information transmitted through the DL-GCH.

In this case, the DL-HARQ unit 124 may use an N stop-and-wait HARQ method in step S160 when transmitting the packet. The packet transmitted from the physical layer may be retransmitted, and an appropriate HARQ process is respectively allocated for each transmission. In the HARQ process, when a decoding error occurs at a receiving end, the retransmission is requested from a transmitting end, and data before forward error correction are stored. When the retransmitted data are received, the retransmitted data and stored data are combined to increase a performance gain. Accordingly, the transmission power may be greatly reduced at the same frame error rate by using the HARQ method.

In addition, the terminal 200 may transmit the second feedback information including the ACK or NACK indicating the error check result for the packet data transmitted through the DL-SCH, and the CQI for the downlink transmission to the base station 100 through the UL-FCH channel.

A method for performing the downlink traffic scheduling operation will now be described.

The packet scheduling device performs the resource allocation based on the information of the second buffer storing the packets to be transmitted to the terminal when the downlink scheduling operation is performed, but it is required to receive the scheduling information of the buffer from the terminal to perform the resource allocation for the uplink traffic. Accordingly, the terminal requests the resource allocation from the base station while transmitting the scheduling information.

As shown in Table 1, when requesting the resource allocation from the base station 100, the terminal 200 uses one among the first resource request method in which the terminal transmits the scheduling information to the base station through the state PDU without transmitting data, the second resource request method in which the terminal transmits scheduling information to the base station by adding the scheduling information to a header of a data transmission PDU, the third resource request method in which the terminal transmits scheduling information to the base station by concatenating the scheduling information to a data transmission PDU, the fourth resource request method in which the terminal transmits scheduling information to the base station by a random access method, and the fifth resource request method in which the terminal transmits the scheduling information by using the physical channel. Particularly, in the exemplary embodiment in the present application, the terminal 200 selects one method among the first to fifth resource request methods according to the channel receiving the resource for the scheduling information to transmit the scheduling information.

In further detail, when the terminal 200 receives the resource allocation information for transmitting the scheduling information by the packet scheduling device 10 of the base station 100 through the UL-GCH and the allocated uplink resource is the UL-SCH, the terminal 200 processes the scheduling information as the IE in the first resource request method, adds the scheduling information to the state PDU, and transmits the state PDU with the scheduling information to the base station without data transmission. In addition, according to the second resource request method, the scheduling information is processed as the IE, and it may be added to a header of a data transmission PDU to be transmitted. Further, according to the third resource request method, after processing the scheduling information as the IE, the scheduling information is concatenated to the data transmission PDU to be transmitted. In this case, the scheduling information is transmitted to the base station 100 through the UL-SCH.

Differing from the above, the terminal 200 receives the resource allocation information for the scheduling information, and, when the allocated uplink resource is UL-SICH, the terminal 200 processes the scheduling information as the IE in the fifth resource request method, and transmits the scheduling information to the base station 100.

In addition, while no resource is allocated from the base station 100, the terminal 200 may process the scheduling information as the IE at a predetermined time, add the scheduling information to the state PDU without the data transmission, and transmit the scheduling information to the base station 100 through the RACH.

As described above, the terminal may use one among the first to fifth resource request methods to process the scheduling information by the data transmission PDU and the state PDU, and to transmit the scheduling information to the base station 100 through the UL-SICH that is the physical channel.

Figure 5:
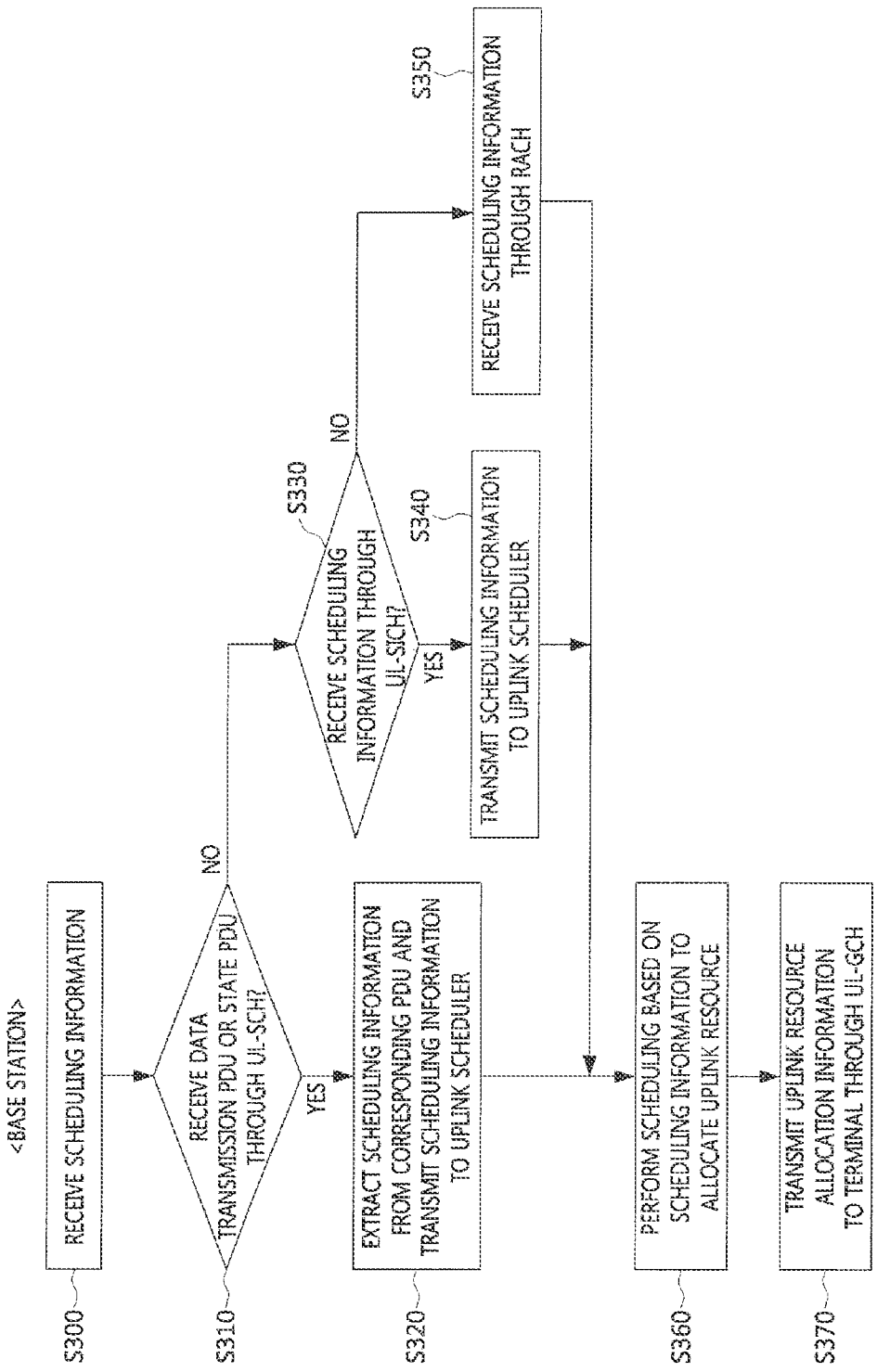
FIG. 5 shows a flowchart representing an uplink scheduling process of the packet scheduling device according to the exemplary embodiment in the present application.

FIG. 5 shows a flowchart representing an uplink scheduling process of the packet scheduling device according to the exemplary embodiment in the present application.

The base station 100 may establish a connection to the terminal, a plurality of parameters for the resource allocation according to a negotiation, and a scheduling method. After performing the negotiation, the terminal 200 waits for the resource allocation from the base station. In this case, the base station 100 may allocate resources regardless of the information transmitted from the terminal.

When the base station allocates the uplink resource for the resource allocation request, the terminal 100 uses one among the first to fourth resource request methods to transmit the scheduling information, processes the SDUs waiting in the transmission buffer as the PDU, and transmits the PDU to the base station 100 through the allocated resource. In this case, the BO information for additional SDUs remaining in the transmission buffer and the BO information for the RTCP packet are generated, and the scheduling information may be formed based on the BO information. The BO information is processed as one independent or integrated IE, and is transmitted through the UL-SCH or the UL-SICH. In addition, the terminal 200 may transmit information required for decoding the PDUs to be transmitted through the UL-HCCH.

When the base station does not allocate the resource, the terminal 200 may transmit the scheduling information through the RACH.

As shown in FIG. 5, the state PDU or the data transmission PDU transmitted to the terminal 200 through the UL-SCH is inputted to the UL-HARQ unit 115 of the packet scheduling device 10 in the MAC layer, and the UL-HARQ unit 115 transmits the input packet data to the demultiplexer 113 in steps S300 to S310. The demultiplexer 113 extracts the scheduling information from the input packet data, transmits the information to the uplink scheduler 114, and other data are transmitted to the ARQ 112 in step S320.

When the scheduling information is transmitted from the terminal 200 through the UL-SICH that is the physical channel, the UL-HARQ 115 transmit the scheduling information to the uplink scheduler 114 in steps S330 and S340. In addition, when the scheduling information is transmitted from the terminal 200 through the RACH, the corresponding scheduling information in the state PDU is directly provided to the uplink scheduler 114 in step S350.

The uplink scheduler 114 allocates the resource for the data transmission to the corresponding terminal at a predetermined resource allocation time based on the scheduling information transmitted through the demultiplexer 113, the UL-HARQ 115, or the RACH in step S360. The uplink resource allocation information for the resource allocated for the data transmission is transmitted to the corresponding terminal 200 through the UL-GCH in step S370.

When the resource allocation for the uplink packet traffic is performed, the data transmission is performed between the terminal 200 and the base station 100.

Figure 6:
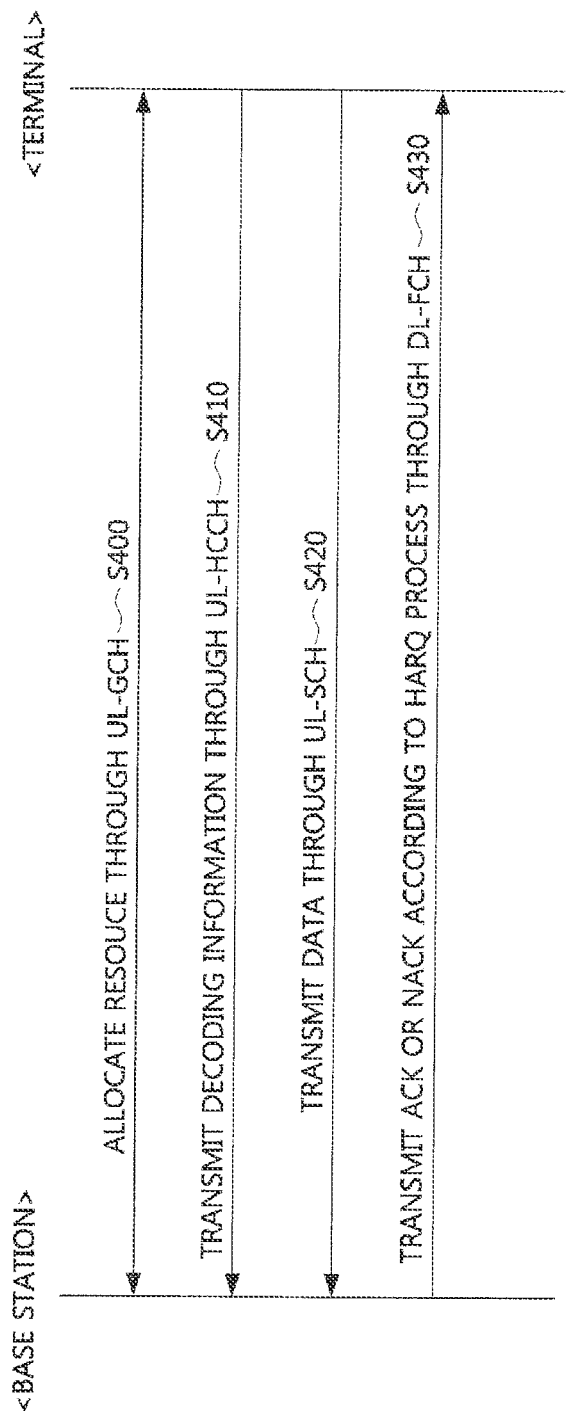
FIG. 6 shows a flowchart representing an uplink packet traffic process according to the exemplary embodiment in the present application.

FIG. 6 shows a flowchart representing an uplink packet traffic process according to the exemplary embodiment in the present application.

When the base station 100 transmits the uplink resource allocation information for the data transmission through the UL-GCH, the terminal 200 transmits information required for decoding the data to be transmitted through the UL-HCCH in steps S400 and S410.

After processing the data (SDUs) as the PDU based on the uplink resource allocation information, the terminal 200 transmits the PDU to the base station through the allocated resource on the UL-SCH in step S420. In this case, the scheduling information may be included. In addition, after receiving the resource and transmitting the data according to the uplink scheduling, the terminal 200 transmits information including the HARQ process information, the redundancy and constellation version, and the new data indicator to the base station 100 through the UL-HCCH.

The UL-HARQ unit 115 of the base station 100 receives the data transmitted through the UL-SCH, performs an error check, and transmits a response signal (the ACK or the NACK) according to an error check result to the terminal through the DL-FCH in step S430. When the response signal is the NACK, as shown in FIG. 5, the uplink scheduler 114 performs the resource allocation for retransmitting the data, and the terminal 200 retransmits the data transmitted in step S420 through the resources allocated for the retransmission.

In the flowchart shown in FIG. 5, the UL-HARQ 115 receives the scheduling information, performs the HARQ process for the scheduling information, and may transmit a result of the HARQ process to the terminal 200 through the DL-FCH.

As described, since the transport and physical channels are divided according to characteristics of the transmitted information, and the resource allocation request, the information transmission for the uplink and downlink scheduling, and the traffic transmission are performed through the corresponding channel, the resource allocation request and the scheduling may be further efficiently performed.

The above-described packet scheduling method is not only realized by the exemplary embodiment in the present application, but, on the contrary, is intended to be realized by a program for realizing functions corresponding to the configuration of the exemplary embodiment in the present application or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the exemplary embodiment in the present application, in the packet-based mobile communication system, channels for allocating the resources and transmitting the information and signals are efficiently classified, and the scheduling may be efficiently performed through the channels.

Particularly, since the plurality of terminals efficiently provide scheduling information through the classified channels, the collisions between information transmitted from the terminals may be prevented. Accordingly, since the delay caused by the collisions is prevented, the scheduling may be efficiently performed.

In addition, the plurality of terminals may satisfy the QoS through the classified channels.

What is claimed is:

1. A communication method, the method comprising:
   transmitting, by a terminal, a first message to a base station, wherein the first message comprises first information indicating a first amount of data available for transmission in a first buffer for a first set of logical channels and second information indicating a second amount of data available for transmission in a second buffer for a second set of logical channels;
   receiving, by the terminal, a second message about uplink resources from the base station; and
   transmitting, by the terminal, data to the base station using the uplink resources.

2. The method of claim 1, wherein the first information indicates non-zero amount of data in the first buffer.

3. The method of claim 2, wherein the second information indicates zero amount of data in the second buffer.

4. The method of claim 1, wherein the first message is transmitted through an Uplink Shared Channel (UL-SCH).

5. The method of claim 4, wherein the data is transmitted to the base station through the UL-SCH.

6. The method of claim 1, wherein the second message further includes a terminal identifier and a modulation scheme for the data.

7. A terminal, comprising:
   a circuitry which is configured to:
      cause the terminal to transmit a first message to a base station, wherein the first message comprises first information indicating a first amount of data available for transmission in a first buffer for a first set of logical channels and second information indicating a second amount of data available for transmission in a second buffer for a second set of logical channels;
      cause the terminal to receive a second message about uplink resources from the base station; and
      cause the terminal to transmit data to the base station using the uplink resources.

8. The terminal of claim 7, wherein the first information indicates non-zero amount of data in the first buffer.

9. The terminal of claim 8, wherein the second information indicates zero amount of data in the second buffer.

10. The terminal of claim 7, wherein the first message is transmitted through an Uplink Shared Channel (UL-SCH).

11. The terminal of claim 10, wherein the data is transmitted to the base station through the UL-SCH.

12. The terminal of claim 7, wherein the second message further includes a terminal identifier and a modulation scheme for the data.

13. A communication device for a terminal, the communication device comprising:
   a circuitry which is configured to:
      cause the terminal to transmit a first message to a base station, wherein the first message comprises first information indicating a first amount of data available for transmission in a first buffer for a first set of logical channels and second information indicating a second amount of data available for transmission in a second buffer for a second set of logical channels;
      cause the terminal to receive a second message about uplink resources from the base station; and
      cause the terminal to transmit data to the base station using the uplink resources.

14. The communication device of claim 13, wherein the first information indicates non-zero amount of data in the first buffer.

15. The communication device of claim 14, wherein the second information indicates zero amount of data in the second buffer.

16. The communication device of claim 13, wherein the first message is transmitted through an Uplink Shared Channel (UL-SCH).

17. The communication device of claim 16, wherein the data is transmitted to the base station through the UL-SCH.

18. The communication device of claim 13, wherein the second message further includes a terminal identifier and a modulation scheme for the data.

* * * * *